United States Patent
Guo

(10) Patent No.: US 9,736,722 B2
(45) Date of Patent: *Aug. 15, 2017

(54) METHOD AND APPARATUS OF SMALL CELL ENHANCEMENT IN A WIRELESS COMMUNICATION SYSTEM

(71) Applicant: INNOVATIVE SONIC CORPORATION, Taipei (TW)

(72) Inventor: Yu-Hsuan Guo, Taipei (TW)

(73) Assignee: INNOVATIVE SONIC CORPORATION, Taipei (TW)

(*) Notice: Subject to any disclaimer, the term of this patent is extended or adjusted under 35 U.S.C. 154(b) by 9 days.

This patent is subject to a terminal disclaimer.

(21) Appl. No.: 15/014,565

(22) Filed: Feb. 3, 2016

(65) Prior Publication Data
US 2016/0174236 A1 Jun. 16, 2016

Related U.S. Application Data

(63) Continuation of application No. 14/139,099, filed on Dec. 23, 2013, now Pat. No. 9,295,077.
(Continued)

(51) Int. Cl.
*H04W 28/02* (2009.01)
*H04W 72/12* (2009.01)
(Continued)

(52) U.S. Cl.
CPC ... *H04W 28/0278* (2013.01); *H04W 72/1268* (2013.01); *H04W 72/1284* (2013.01);
(Continued)

(58) Field of Classification Search
CPC ............. H04W 28/0278; H04W 72/14; H04W 72/1268; H04W 72/1284
See application file for complete search history.

(56) References Cited

U.S. PATENT DOCUMENTS

2009/0285104 A1* 11/2009 Tseng ................ H04W 72/1284
370/241
2010/0091726 A1* 4/2010 Ishii ......................... H04L 1/18
370/329
(Continued)

FOREIGN PATENT DOCUMENTS

CN 101841844 A 9/2010
EP 2230875 A2 * 9/2010 ............. H04W 74/02

OTHER PUBLICATIONS

Damnjanovic et al., Buffer Status Reporting and Logical Channel Prioritization in Multiflow Operation, U.S. Appl. No. 61/723,398, filed Nov. 2012.*
(Continued)

*Primary Examiner* — Ian N Moore
*Assistant Examiner* — Justin T Van Roie
(74) *Attorney, Agent, or Firm* — Blue Capital Law Firm, P.C.

(57) ABSTRACT

A method and apparatus are disclosed to provide small cell enhancement in a wireless communication system. The method includes connecting to more than one serving cell. The method further includes triggering a Buffer Status Report (BSR) or a Power Headroom Report (PHR). The method further includes transmitting a Medium Access Control (MAC) control element corresponding to the BSR or the PHR in a serving cell, wherein the serving cell depends on a trigger of the BSR or the PHR.

16 Claims, 14 Drawing Sheets

Related U.S. Application Data

(60) Provisional application No. 61/745,736, filed on Dec. 24, 2012, provisional application No. 61/752,150, filed on Jan. 14, 2013, provisional application No. 61/768,761, filed on Feb. 25, 2013.

(51) Int. Cl.
*H04W 72/14* (2009.01)
*H04W 88/02* (2009.01)
*H04W 88/08* (2009.01)

(52) U.S. Cl.
CPC ............ *H04W 72/14* (2013.01); *H04W 88/02* (2013.01); *H04W 88/08* (2013.01)

(56) References Cited

U.S. PATENT DOCUMENTS

| | | | | |
|---|---|---|---|---|
| 2011/0143765 A1* | 6/2011 | Moulsley | ......... | H04W 72/1252 455/450 |
| 2012/0069805 A1* | 3/2012 | Feuersanger | ..... | H04W 72/1284 370/329 |
| 2012/0093128 A1* | 4/2012 | Song | ................ | H04W 36/0077 370/331 |
| 2012/0140743 A1* | 6/2012 | Pelletier | ............ | H04W 72/0453 370/335 |
| 2012/0147869 A1* | 6/2012 | Chhatriwala | ....... | H04W 28/065 370/338 |
| 2013/0176953 A1* | 7/2013 | Stern-Berkowitz | . | H04W 52/146 370/329 |
| 2014/0126399 A1* | 5/2014 | Damnjanovic | ... | H04W 72/1252 370/252 |

OTHER PUBLICATIONS

Office Action on corresponding CN Patent Application No. 201310722317.1 dated Sep. 29, 2016.

* cited by examiner

METHOD AND APPARATUS OF SMALL CELL ENHANCEMENT IN A WIRELESS COMMUNICATION SYSTEM

CROSS-REFERENCE TO RELATED APPLICATIONS

This application is a continuation of U.S. patent application Ser. No. 14/139,099, filed on Dec. 23, 2013, now U.S. Pat. No. 9,295,077, which claims the benefit of U.S. Provisional Patent Application Ser. No. 61/745,736, filed on Dec. 24, 2012, U.S. Provisional Patent Application Ser. No. 61/752,150, filed on Jan. 14, 2013, and U.S. Provisional Patent Application Ser. No. 61/768,761, filed on Feb. 25, 2013, the entire disclosure of which are incorporated herein by reference.

FIELD

This disclosure generally relates to wireless communication networks, and more particularly, to methods and apparatuses for small cell enhancement in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses are disclosed to provide small cell enhancement in a wireless communication system. One method includes connecting to more than one serving cell. The method further includes triggering a Buffer Status Report (BSR) or a Power Headroom Report (PHR). The method further includes transmitting a Medium Access Control (MAC) control element corresponding to the BSR or the PHR in a serving cell, wherein the serving cell depends on a trigger of the BSR or the PHR.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-122033, "New Study Item Description: Small Cell enhancements for E-UTRA and E-UTRAN—Higher-layer aspects", TR 36.932 V12.0.0, "Scenarios and Requirements of LTE Small Cell Enhancements", TS 36.321 V11.0.0, "E-UTRA MAC protocol specification", TS 36.331 V11.1.0, "E-UTRA RRC protocol specification", TS 36.300 V11.3.0, "E-UTRA and E-UTRAN Overall description; Stage 2", TS 36.300 V11.4.0, "E-UTRA and E-UTRAN; Overall description; Stage 2", TS 36.331 V11.2.0, "E-UTRA RRC protocol specification (Release 11)", RWS-120046, "Technologies for Rel-12 and onwards", R2-130845, "TR 36.842 v0.1.0 on Study on Small Cell Enhancements for E-UTRA and E-UTRAN—Higher-layer aspects", NTT DOCOMO, TS 36.321 V11.1.0, "E-UTRA MAC protocol specification (Release 11)". The standards, documents, and applications listed above are hereby expressly incorporated by reference in their entirety.

Figure 1:
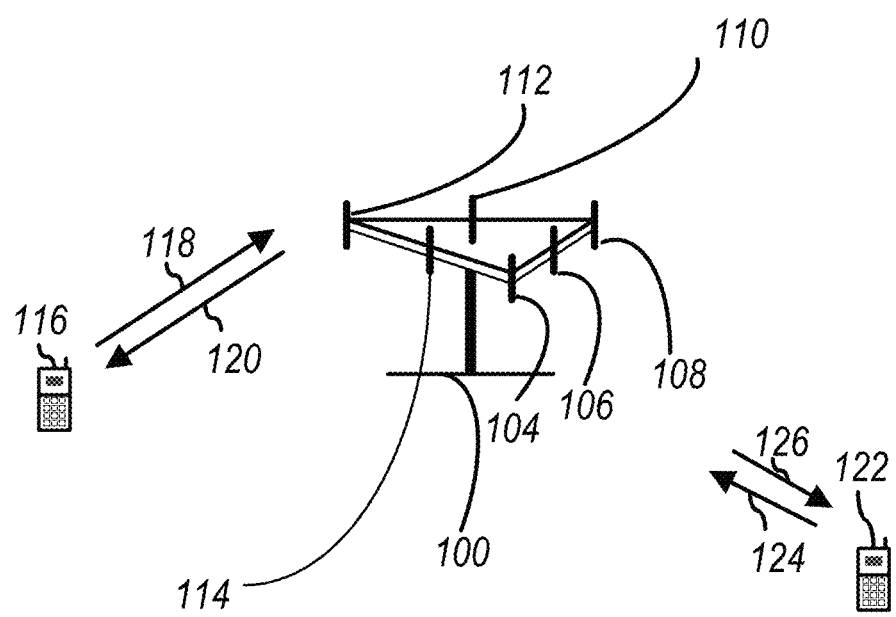
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNB, or some other terminology. An access terminal (AT) may also be called user equipment (UE), a wireless communication device, terminal, access terminal or some other terminology.

Figure 2:
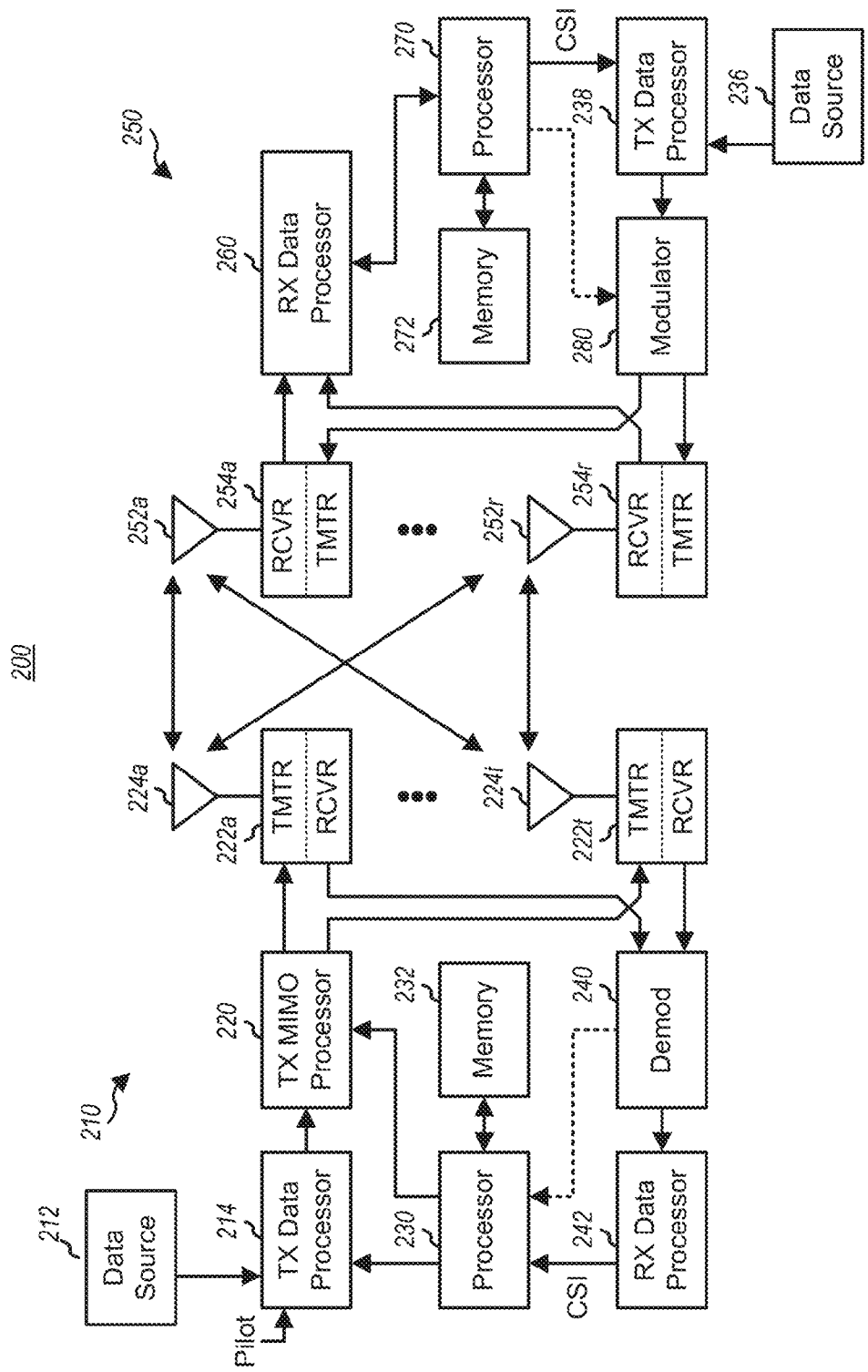
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
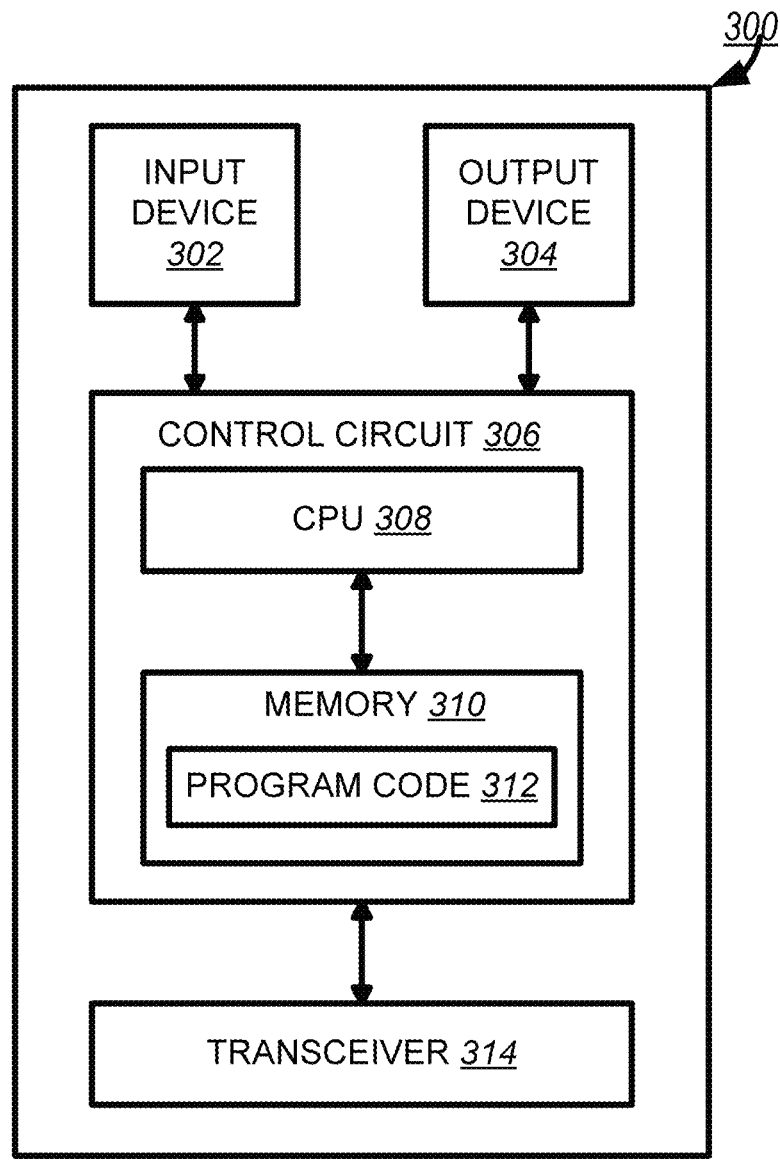
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
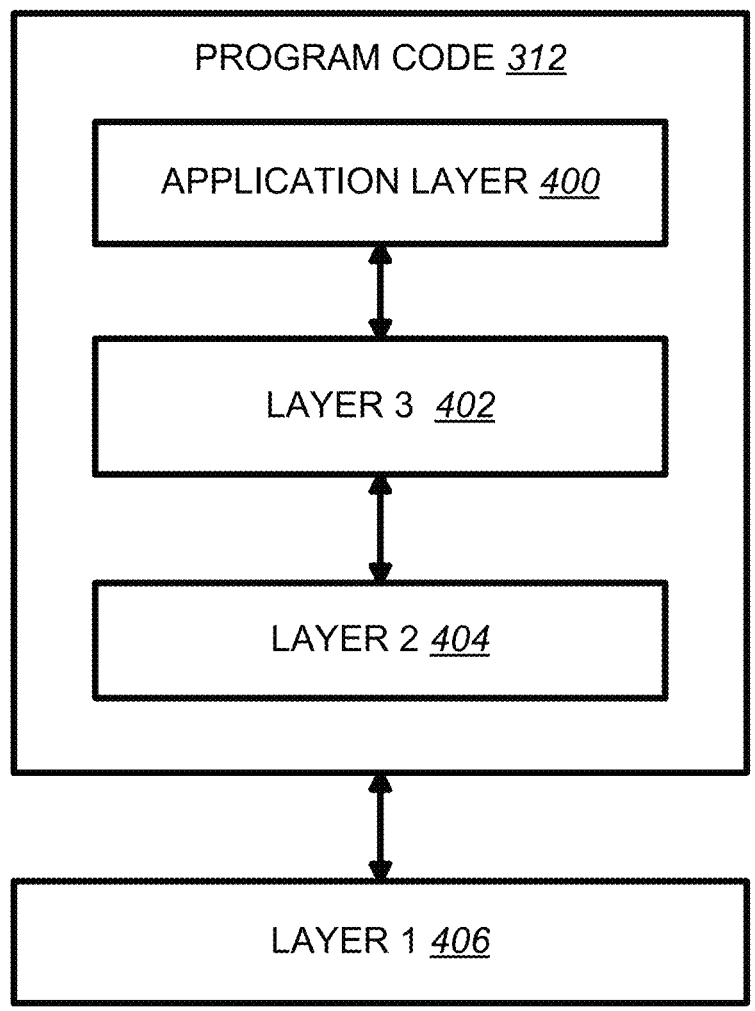
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

3GPP RP-122033 approved a new study item entitled "New Study Item Description: Small Cell enhancements for E-UTRA and E-UTRAN—Higher-layer aspects" for LTE Rel-12. The justification and objective of the study item are quoted below:

3 Justification

Further enhancements for indoor and outdoor scenarios using low-power nodes were identified as one of the most important topics in the 3GPP workshop on Rel-12 and onward. According to this big interest in small cell enhancements, scenarios and requirements for small cell enhancements were studied and captured in TR 36.932.

It is needed to study potential technologies of higher-layer aspects for small cell enhancements taking into account these scenarios and requirements (e.g., increased user throughput and enhanced mobility performance).

4 Objective

The objective of this study is to identify potential technologies in the protocol and architecture for enhanced support of small cell deployment and operation which should satisfy scenarios and requirements defined in TR 36.932.

The study shall be conducted on the following aspects:

Identify and evaluate the benefits of UEs having dual connectivity to macro and small cell layers served by different or same carrier and for which scenarios such dual connectivity is feasible and beneficial.

Identify and evaluate potential architecture and protocol enhancements for the scenarios in TR 36.932 and in particular for the feasible scenario of dual connectivity and minimize core network impacts if feasible, including:

Overall structure of control and user plane and their relation to each other, e.g., supporting C-plane and U-plane in different nodes, termination of different protocol layers, etc.

Identify and evaluate the necessity of overall Radio Resource Management structure and mobility enhancements for small cell deployments:

Mobility mechanisms for minimizing inter-node UE context transfer and signalling towards the core network.

Measurement and cell identification enhancements while minimizing increased UE battery consumption.

For each potential enhancement, the gain, complexity and specification impact should be assessed. The study shall focus on potential enhancements which are not covered by other SI/WIs.

In 3GPP TR 36.932 V12.0.0, a small cell may be defined as follows:

Small cells using low power nodes are considered promising to cope with mobile traffic explosion, especially for hotspot deployments in indoor and outdoor scenarios. A low-power node generally means a node whose Tx power is lower than macro node and BS classes, for example Pico and Femto eNB are both applicable.

Figure 5:
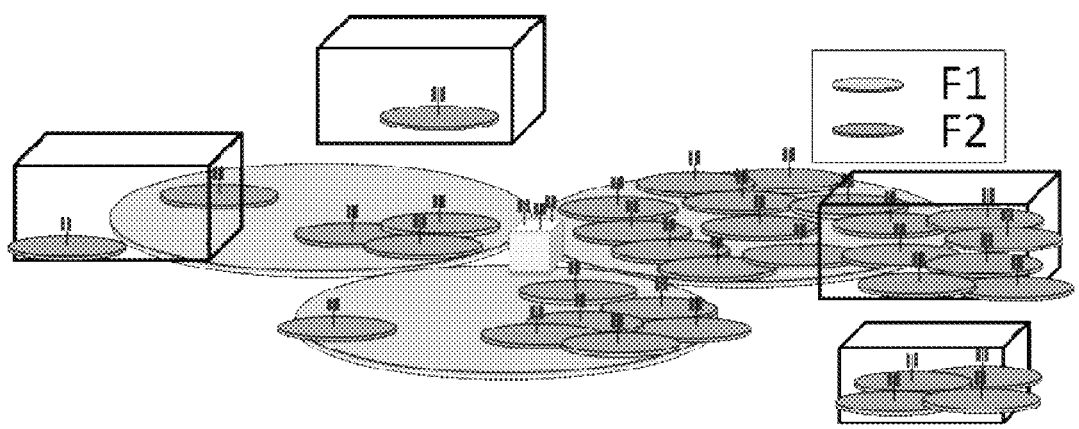
FIG. 5 is a diagram of deployment scenarios of small cell with and/or without macro coverage.

Additionally, 3GPP TR 36.932 V12.0.0 mentions that the enhancements for small cells should target both with and without macro coverage, both outdoor and indoor small cell deployments, both ideal and non-ideal backhaul, and both sparse and dense small cell deployments. An illustration of small cell deployment is shown in FIG. 5.

Furthermore, 3GPP TR 36.932 V12.0.0 also mentions the possible characteristics of backhaul used by small cells as follows:

6.1.3 Ideal and Non-ideal Backhaul

Both ideal backhaul (i.e., very high throughput and very low latency backhaul such as dedicated point-to-point connection using optical fiber, LOS microwave) and non-ideal backhaul (i.e., typical backhaul widely used in the market such as xDSL, NLOS microwave, and other backhauls like relaying) should be studied. The performance-cost trade-off should be taken into account.

A categorization of non-ideal backhaul based on operator inputs is listed in Table 6.1-1:

TABLE 6.1-1

Categorization of non-ideal backhaul

| Backhaul Technology | Latency (One way) | Throughput | Priority (1 is the highest) |
| --- | --- | --- | --- |
| Fiber Access 1 | 10-30 ms | 10M-10 Gbps | 1 |
| Fiber Access 2 | 5-10 ms | 100-1000 Mbps | 2 |
| DSL Access | 15-60 ms | 10-100 Mbps | 1 |
| Cable | 25-35 ms | 10-100 Mbps | 2 |
| Wireless Backhaul | 5-35 ms | 10 Mbps-100 Mbps typical, maybe up to Gbps range | 1 |

A categorization of good to ideal backhaul based on operator inputs is listed in Table 6.1-2:

TABLE 6.1-2

Categorization of good to ideal backhaul

| Backhaul Technology | Latency (One way) | Throughput | Priority (1 is the highest) |
| --- | --- | --- | --- |
| Fiber | 2-5 ms | 50M-10 Gbps | 1 |

For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Figure 6:
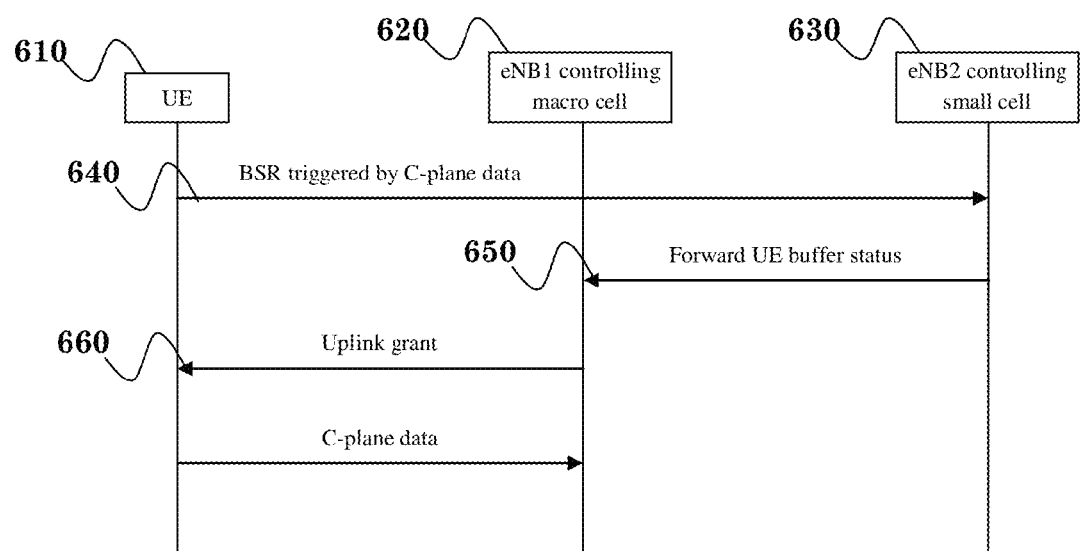
FIG. 6 is a diagram of UE buffer status forwarding between evolved Node Bs (eNBs).
Figure 7:
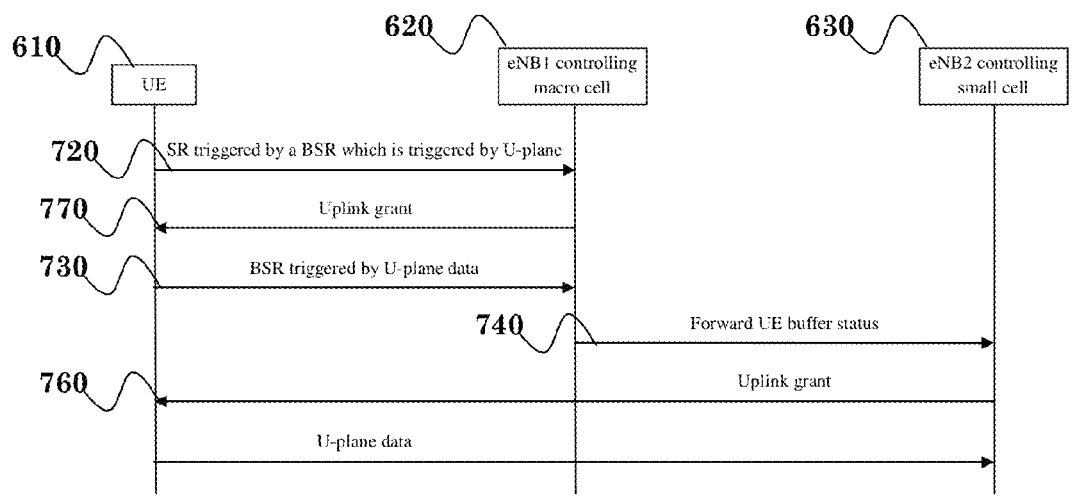
FIG. 7 is a diagram of UE buffer status forwarding between evolved Node Bs (eNBs).

In one scenario, a macro cell and a small cell are controlled by different eNBs. When a UE has dual connectivity to the macro cell and the small cell at the same time, information exchange between the two eNBs may be required. For example, in order to realize C-plane and U-plane in different nodes (e.g., the macro cell for C-plane and the small cell for U-plane), UE information received by one eNB (e.g., UE buffer status as shown in FIG. 6) may need to be delivered to another proper eNB because there is currently no limitation about which cell the UE information should be transmitted to. That is, the UE information can be transmitted to any serving cell in which an uplink grant is received as disclosed in 3GPP TS 36.321 V11.0.0. As a result, the latency of information exchange between the two eNBs, typically 2 to 60 ms, is not negligible and would negatively impact the performance, such as increasing transmission delay. Moreover, the benefit of offloading the traffic of a macro cell may not be maximized because the radio resource of macro cell may be consumed to deliver information for small cell as shown in FIG. 7.

In various embodiments, methods are directed to eliminating or minimizing delay for information exchange between eNBs and offload traffic of macro cell to small cell. In these methods, C-plane and U-plane data are split as well as control information handled by Medium Access Control (MAC) is split when a UE has dual connectivity to a macro cell and a small cell at the same time. The control information includes, but is not limited to, Buffer Status Report (BSR), Power Headroom Support (PHR), or Scheduling Request (SR).

Figure 8:
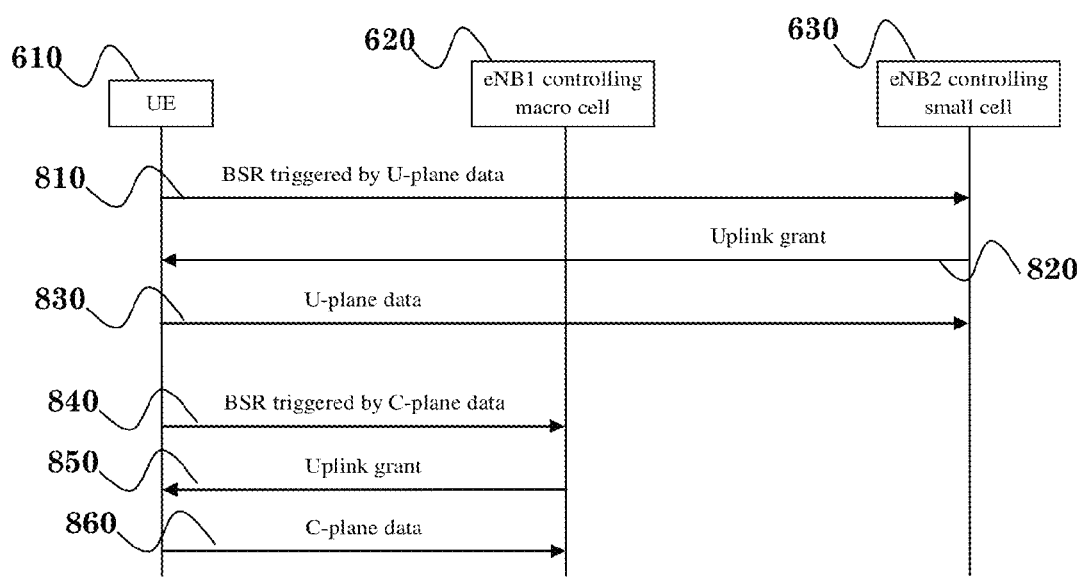
FIG. 8 is a flow diagram according to one exemplary embodiment.

In one embodiment, the BSR is divided into at least two categories. By way of example and not of limitation, the categories of BSR are one is transmitted in macro cell(s), one is transmitted in small cell(s), one is transmitted in serving cell(s) for C-plane, or one is transmitted in serving cell(s) for U-plane. For example, as shown in FIG. 8, at step 810, a BSR is transmitted in one of serving cells which is a small cell 630 (or is for U-plane) because the BSR transmission is triggered by U-plane data, e.g. from a Data Radio Bearer (DRB). The eNB controlling the small cell 630 transmits an uplink grant to the UE 610 at step 820. At step 830, the U-plane data is transmitted to a serving cell, which is a small cell 630 (or is for U-plane). Additionally, FIG. 8 illustrates that, at step 840, a BSR is transmitted in one of serving cells which is a macro cell 620 (or is for C-plane) because the BSR transmission is triggered by C-plane data. The eNB controlling a macro cell 620 transmits an uplink grant to the UE 610 at step 850. At step 860, the C-plane data is transmitted to a serving cell, which is a macro cell 620.

In one embodiment, a method of a UE includes: triggering a BSR and transmitting a MAC control element corresponding to the BSR in a specific serving cell, wherein the specific serving cell depends on a trigger of the BSR. At least one of the following transmission rules of the MAC control element could be used:

If the trigger is higher priority data arrival from a specific logical channel (or logical channel group (as disclosed in 3GPP TS 36.331 V11.1.0) or Radio Bearer (RB) (as disclosed in 3GPP TS 36.331 V11.1.0)), the MAC control element should be transmitted in a serving cell (of a serving cell group) corresponding to the logical channel (or logical channel group or RB).

If the trigger is higher priority data arrival from U-plane, e.g. a DRB, the MAC control element should be transmitted in a serving cell which is configured to receive U-plane data.

If the trigger is a periodic buffer status reporting timer expiry, the MAC control element should be transmitted in a serving cell (of a serving cell group) corresponding to the periodic buffer status reporting timer.

If the trigger is a buffer status retransmission timer expiry, the MAC control element should be transmitted in a serving cell (of a serving cell group) corresponding to the buffer status retransmission timer.

If the trigger is higher priority data arrival from a specific logical channel (or logical channel group or RB), the MAC control element should be transmitted by a MAC entity corresponding to the logical channel (or logical channel group or RB).

If the trigger is higher priority data arrival from U-plane, e.g. a DRB, the MAC control element should be transmitted by a MAC entity which is used to transmit U-plane data.

If the trigger is a periodic buffer status reporting timer expiry, the MAC control element should be transmitted by a MAC entity corresponding to the periodic buffer status reporting timer.

If the trigger is a buffer status retransmission timer expiry, the MAC control element should be transmitted by a MAC entity corresponding to the buffer status retransmission timer.

In the above embodiment, more than one periodic buffer status reporting timer, e.g. periodicBSR-Timer as disclosed in 3GPP TS 36.321 V11.0.0, is used to trigger a BSR. More than one buffer status retransmission timer, e.g. retxBSR-Timer as disclosed in 3GPP TS 36.321 V11.0.0, is used to trigger a BSR. The MAC control element does not include status of buffered data which can't be transmitted in the serving cell. In other words, the MAC control element only includes status of buffered data which can be transmitted in the serving cell.

Figure 9:
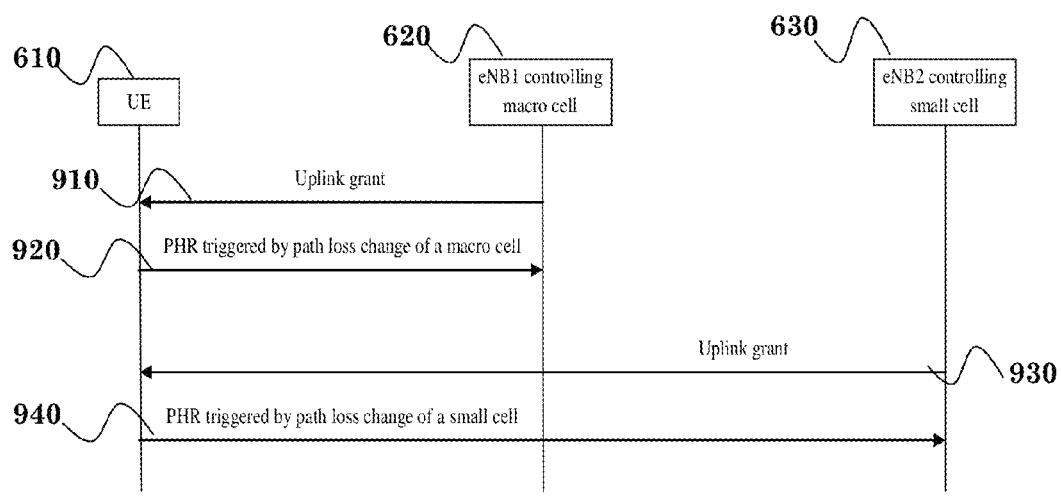
FIG. 9 is a flow diagram according to one exemplary embodiment.

In one embodiment, the PHR is divided into at least two categories. By way of example and not of limitation, the categories of the PHR are one transmitted in macro cell(s), one transmitted in small cell(s), one is transmitted in serving cell(s) for C-plane, or one transmitted in serving cell(s) for U-plane. For example, as shown in FIG. 9, at step 940, a PHR is transmitted in one of serving cells which is a small cell 630 (or is for U-plane) because the PHR transmission is triggered by a small cell 630 (or a serving cell for U-plane), e.g., due to path loss change. At step 930, the eNB controlling the small cell 630 transmits an uplink grant to the UE 610. Additionally, FIG. 9 illustrates that, at step 920, a PHR is transmitted in one of serving cells which is a macro cell 620 (or is for C-plane) because the PHR transmission is triggered by a macro cell 620 (or a serving cell for C-plane), e.g., due to path loss change. The eNB controlling a macro cell 620 transmits an uplink grant to the UE 610 at step 910.

In one embodiment, a method of a UE includes: triggering a PHR and transmitting a MAC control element corresponding to the PHR in a specific serving cell, wherein the specific serving cell depends on a trigger of the PHR. At least one of the following transmission rules of the MAC control element could be used:

If the trigger is path loss change for a first serving cell, the MAC control element should be transmitted in a second serving cell of a serving cell group including the first serving cell. The first serving cell and the second serving cell can be the same serving cell.

If the trigger is a periodic power headroom reporting timer expiry, the MAC control element should be transmitted in a serving cell of a serving cell group corresponding to the periodic power headroom reporting timer.

If the trigger is path loss change for a serving cell, the MAC control element should be transmitted by a MAC entity corresponding to the serving cell.

If the trigger is a periodic power headroom reporting timer expiry, the MAC control element should be transmitted by a MAC entity corresponding to the periodic power headroom reporting timer.

In the above embodiment, more than one periodic power headroom reporting timer, e.g. periodicPHR-Timer as disclosed in 3GPP TS 36.321 V11.0.0, is used to trigger a PHR. The MAC control element transmitted in a third serving cell does not include status of power headroom for a fourth serving cell if the third serving cell and the fourth serving cell are not included in the same serving cell group. In other words, the MAC control element transmitted in the third serving cell only includes status of power headroom for serving cell(s) that belongs to the same group as the third serving cell.

Figure 10:
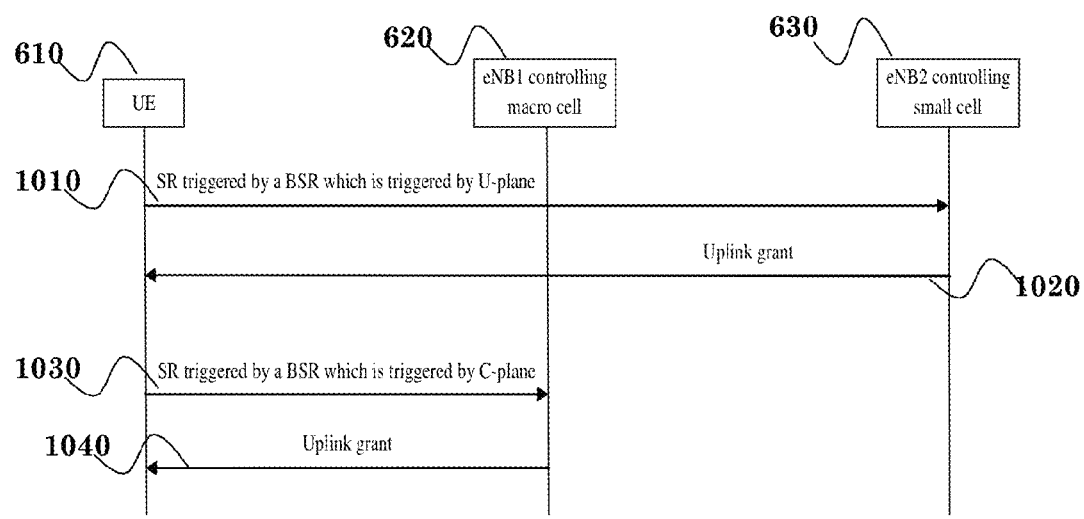
FIG. 10 is a flow diagram according to one exemplary embodiment.

In one embodiment, a SR is divided into at least two categories. By way of example and not of limitation, the categories of the SR are one transmitted in macro cell(s), one transmitted in small cell(s), one transmitted in serving cell(s) for C-plane, or one transmitted in serving cell(s) for U-plane. For example, as shown in FIG. 10, at step 1010, a SR is transmitted on a Physical Uplink Control Channel (PUCCH) resource for SR in one of serving cells which is a small cell 630 (or is for U-plane) because the SR is triggered by a BSR transmission which is triggered by U-plane data (e.g., from a DRB). At step 1020, the eNB controlling the small cell 630 transmits an uplink grant to the UE 610. Additionally, FIG. 10 illustrates that, at step 1030, a SR is transmitted on a PUCCH resource for SR in one of serving cells which is a macro cell 620 (or is for C-plane) because the SR is triggered by a BSR transmission which is triggered by C-plane data (e.g., from a DRB). At step 1040, the eNB controlling the macro cell 620 transmits an uplink grant to the UE 610.

In one embodiment, a method of a UE includes: triggering a BSR. The method further includes triggering a SR due to the BSR and transmitting the SR on PUCCH of a specific serving cell, wherein the specific serving cell depends on a trigger of the BSR. At least one of the following transmission rules of the SR could be used:
  If the trigger is higher priority data arrival from a specific logical channel (or logical channel group or RB), the SR should be transmitted on PUCCH of a serving cell (of a serving cell group) corresponding to the logical channel (or logical channel group or RB).
  If the trigger is higher priority data arrival from U-plane, e.g. a DRB, the SR should be transmitted on PUCCH of a serving cell which is configured to receive U-plane data.
  If the trigger is higher priority data arrival from a specific logical channel (or logical channel group or RB), the SR should be transmitted by a MAC entity corresponding to the logical channel (or logical channel group or RB).
  If the trigger is higher priority data arrival from U-plane, e.g. a DRB, the SR should be transmitted by a MAC entity which is used to transmit U-plane data.

In the above embodiment, the SR is transmitted on a PUCCH of a serving cell corresponding to the MAC entity. PUCCH resource for SR is configured in more than one serving cell of the UE, e.g. in one cell for C-plane data and in the other one cell for U-plane data, or in one cell for a MAC entity and in the other cell for another MAC entity, or in one cell which is a small cell and in the other cell which is a macro cell, or in cells controlled by different eNBs.

In these embodiments, mapping between the timer and the serving cell (or a group of serving cells including the serving cell) is configured. Mapping between the timer and the MAC entity is configured. The MAC control element is transmitted in a serving cell corresponding to the MAC entity. Mapping between the logical channel (or logical channel group or RB) and the serving cell (or a group of serving cells including the serving cell) is configured. Mapping between the logical channel (or logical channel group or RB) and the MAC entity is configured. Mapping between the MAC entity and the serving cell (or a group of serving cells) is configured. The mapping may be configured according to information provided by network. More than one MAC entity is used by the UE, e.g. one for C-plane data and the other one for U-plane data, or one for small cells and the other one for macro cells, or one MAC entity corresponds to one eNB. Serving cells of the UE are divided into more than one group, e.g. one group for C-plane data and the other group for U-plane data, or one group for a MAC entity and the other group for another MAC entity, or one group is small cells and the other group is macro cells, or serving cells controlled by the same eNB are in the same group. C-plane data includes data from Signaling Radio Bearer (SRB) (as disclosed in 3GPP TS 36.331 V11.1.0). U-plane data includes data from DRB (as disclosed in 3GPP TS 36.331 V11.1.0).

In another embodiment, a UE has more than one Medium Access Control (MAC) entity. For example, the UE may have a MAC entity for C-plane, one for U-plane, one for macro cell(s) or one for small cell(s). Each MAC entity has its own Discontinuous Reception (DRX) operation (e.g. when to monitor PDCCH), measurement gap configuration as defined in 3GPP TS 36.331 V11.1.0, BSR procedure (for triggering or transmitting), PHR procedure (for triggering or transmitting), and/or SR procedure (for triggering or transmitting with its own SR resource). According to one embodiment, the determination of how to apply a received MAC control element depends on where it received. For example, a DRX command MAC control element is applied to a DRX procedure of a MAC entity which receives the DRX command MAC control element.

Figure 11:
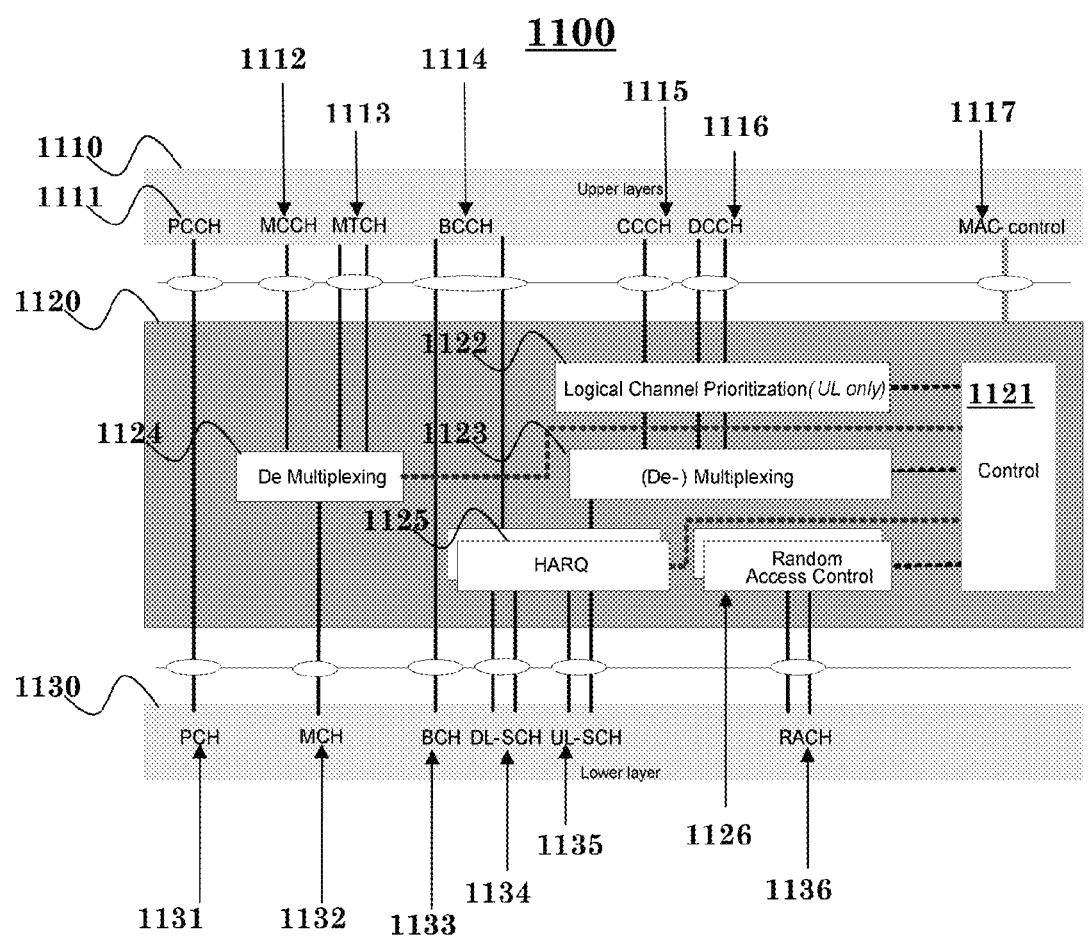
FIG. 11 is a block diagram for a Medium Access Control (MAC) entity for Control Plane (C-plane).

FIG. 11 illustrates one embodiment of a relation 1100 between MAC entity for C-plane 1120, an upper layer 1110 of the MAC entity for C-plane 1120, and a lower layer 1130 of the MAC entity for C-plane 1120. As shown in FIG. 11, the upper layer 1110 includes PCCH, MCCH, MTCH, BCCH, CCCH, DCCH, and a MAC control. The MAC entity for C-plane 1120 includes a Control in communication with Logical Channel Prioritization (UL only), (De-) Multiplexing, De Multiplexing, HARQ, and Random Access Control. The lower layer 1130 includes PCH, MCH, BCH, DL-SCH, UL-SCH, and RACH.

Figure 12:
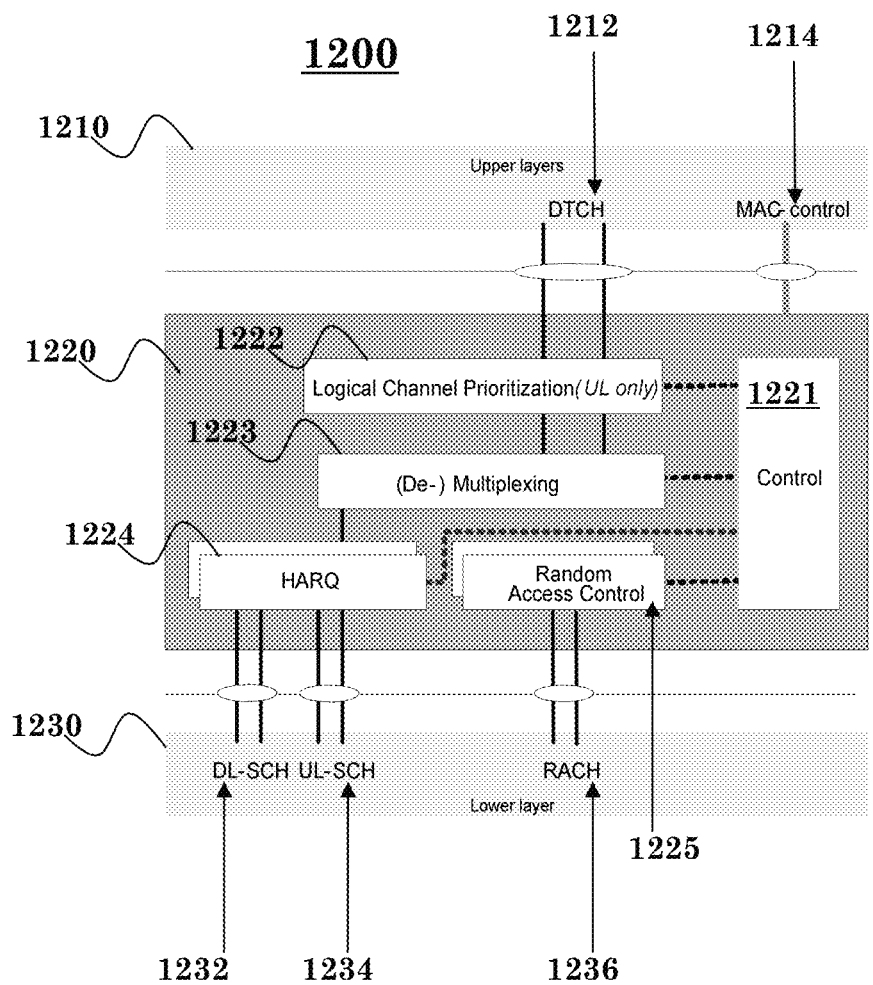
FIG. 12 is a block diagram for a MAC entity for User Plane (U-plane).

FIG. 12 illustrates one embodiment of a relation 1200 between MAC entity for U-plane 1220, an upper layer 1210 of the MAC entity for U-plane 1220, and a lower layer 1230 of the MAC entity for U-plane 1220. As shown in FIG. 12, the upper layer 1210 includes DTCH and MAC control. The MAC entity for U-plane 1220 includes a Control in communication with Logical Channel Prioritization (UL only), (De-) Multiplexing, HARQ, and Random Access Control. The lower layer 1230 includes DL-SCH, UL-SCH, and RACH.

Besides, in this scenario with dual connectivity to macro and small cells, there is an issue of whether C-plane and U-plane need to be separated completely based upon the cell type. For example, the macro cell may be assigned for C-plane data, and the small cell is assigned for U-plane data. It is assumed that C-plane and U-plane assigned to different nodes in order to ease the loading of the macro cell by moving U-plane loading to small cells. However, the macro cell may have sufficient radio resources to handle U-plane data in a situation where the traffic loading is low. Accordingly, the restriction of completely separating C-plane and U-plane would not be necessary.

Various embodiments are directed to network control of the separation of C-plane and U-plane in order to enhance performance of the cells and flexibly distribute the loading for C-plane and U-plane among the cells. In one embodiment, the separation depends on the loading of the cells. In another embodiment, separation is based on a RB basis. In another embodiment, separation is based upon a logical channel basis. In yet another embodiment, separation is based upon a logical channel group basis.

In one embodiment, mapping between a RB (or a logical channel or a logical channel group) and a serving cell (or a group of serving cells, an eNB, or a MAC entity) is configured according to information provided by the eNB.

In one embodiment, a method of a UE includes: receiving a signaling to configure a mapping corresponding to a data category; and transmitting a data of the data category based on the mapping.

In another embodiment, a method of an eNB includes: transmitting a signaling to configure a mapping corresponding to a data category, in which the mapping is used to inform a UE to transmit a data of the data category based on the mapping.

Additionally, transmitting the data based on the mapping means that where, how, or which radio resources are to be used to transmit the data is according to the mapping, e.g., the data is allowed to be transmitted in a specific cell.

In one embodiment, a method of a UE includes: receiving a signaling to configure a mapping corresponding to a data category; and receiving a data of the data category based on the mapping.

In another embodiment, a method of an eNB includes: transmitting a signaling to configure a mapping corresponding to a data category, in which the mapping is used to inform a UE to receive a data of the data category based on the mapping.

Additionally, receiving the data based on the mapping means that where, how, or which radio resources are to be used to receive the data is according to the mapping, e.g., receiving the data in a specific cell.

In these embodiments, the signaling can be a RRC connection reconfiguration message. Alternatively, the signaling can be a message used to configure Carrier Aggregation.

In these embodiments, the mapping further includes at least one of the following relationships
  A relationship between the data category and a serving cell.
  A relationship between the data category and a group of serving cells. The small cells belong to the same group, the macro cells belong to the same group, or cells controlled by the same eNB belong to the same group.
  A relationship between the data category and an eNB.
  A relationship between the data category and a MAC entity.

In these embodiments, the data category can be categorized based on a RB, logical channel, or logical channel group. Accordingly, data for the same RB belongs to the same data category. Alternatively, data for the same logical channel belongs to the same data category, or data for the same logical channel group belongs to the same data category. Alternatively, the data category can be categorized based on a type of data plane. For example, U-plane data is one data category and C-plane data is another data category.

In these embodiments, the signaling indicates information corresponding to a size of a cell, e.g. a weight for a cell. The signaling may also indicate information corresponding to a type of a cell, e.g. macro or small. Additionally, the signaling may indicate a mapping between cell(s) and eNB(s) or a mapping between MAC entities and cells.

Figure 13:
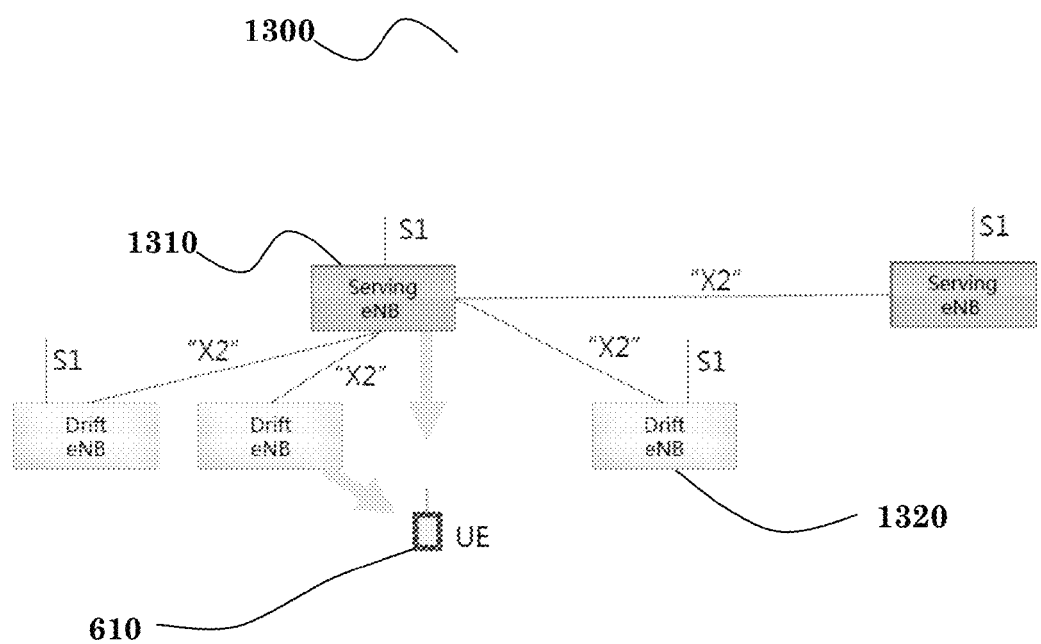
FIG. 13 is a block diagram for a configuration of Inter-eNB Carrier Aggregation.

Additionally, to achieve dual connectivity of macro and small cells, carrier aggregation (CA) is a feasible mechanism. Currently the stage-2 and stage-3 description of CA are specified in 3GPP TS 36.300 V11.4.0 and TS 36.331 V11.2.0, respectively. While the currently specified CA is used for intra-eNB, inter-eNB CA, where the macro and the small cells are controlled by different eNBs, has also been considered (see e.g., RWS-120046) to achieve dual connectivity in small cell enhancement. As disclosed in RWS-120046, a possible architecture of inter-eNB CA 1300 is shown in FIG. 13. As shown in FIG. 13, a network node 1310 called "Serving eNB" controls a macro cell and a network node 1320 called "Drift eNB" controls a small cell.

While 3GPP TR 36.932 v12.0.0 and R2-130845 focus on the deployment scenarios of macro and pico cells connected via non-ideal backhaul, fibre access, which can be used to deploy Remote Radio Heads (RRHs), is not assumed in this study item.

Dual connectivity is considered as one potential enhancement for small cells. Under the scenario of dual connectivity, C-plane and U-plane in different nodes, e.g. eNBs, may be supported.

In order to transmit data, such as C-plane and U-plane data, the network needs to be informed about buffer status to acquire respective uplink resources in different cells. To achieve C-plane and U-plane separation, separation based on per logical channel (group) basis is a possibility. That is, data from some logical channels (e.g., corresponding to SRB(s)) is transmitted in some cell(s) (e.g., macro cells), and data from other logical channels, (e.g., corresponding to DRB(s)) is transmitted in other cell(s) (e.g., pico cells). As a consequence, different network nodes should be informed about the UE buffer status to schedule proper uplink resource to the UE.

According to the current Buffer Status Reporting as disclosed in 3GPP TS 36.321 V11.1.0, the UE could transmit buffer status in any serving cell. However, since the current scenario has macro cells and pico cells connected via non-ideal backhaul, transferring received UE buffer status between macro cells and pico cells may result in unacceptable scheduling delay and poor uplink performance. In order to avoid delay and poor performance, both macro cells and pico cells can be informed about UE buffer status directly by the UE. However, whether the information provided by a Buffer Status Report (BSR) is feasible to the deployment scenarios with small cells is not fully addressed. If a BSR cannot provide proper information, scheduling delay and poor uplink performance may still result. BSR as discussed in 3GPP TS 36.321 V11.1.0 is quoted below:

5.4.5 Buffer Status Reporting
  The Buffer Status reporting procedure is used to provide the serving eNB with information about the amount of data available for transmission in the UL buffers of the UE. RRC controls BSR reporting by configuring the two timers periodicBSR-Timer and retxBSR-Timer and by, for each logical channel, optionally signalling logicalChannelGroup which allocates the logical channel to an LCG [8]. For the Buffer Status reporting procedure, the UE shall consider all radio bearers which are not suspended and may consider radio bearers which are suspended.
  A Buffer Status Report (BSR) shall be triggered if any of the following events occur:
    UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular and Periodic BSR:
if more than one LCG has data available for transmission in the TTI where the BSR is transmitted: report Long BSR;
else report Short BSR.

For Padding BSR:
if the number of padding bits is equal to or larger than the size of the Short BSR plus its subheader but smaller than the size of the Long BSR plus its subheader:
if more than one LCG has data available for transmission in the TTI where the BSR is transmitted: report Truncated BSR of the LCG with the highest priority logical channel with data available for transmission;
else report Short BSR.
else if the number of padding bits is equal to or larger than the size of the Long BSR plus its subheader, report Long BSR.

If the Buffer Status reporting procedure determines that at least one BSR has been triggered and not cancelled:
if the UE has UL resources allocated for new transmission for this TTI:
instruct the Multiplexing and Assembly procedure to generate the BSR MAC control element(s);
start or restart periodicBSR-Timer except when all the generated BSRs are Truncated BSRs;
start or restart retxBSR-Timer.
else if a Regular BSR has been triggered:
if an uplink grant is not configured or the Regular BSR was not triggered due to data becoming available for transmission for a logical channel for which logical channel SR masking (logicalChannelSR-Mask) is setup by upper layers:
a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR. A Padding BSR is triggered for a specific MAC PDU only and the trigger is cancelled when this MAC PDU has been built.

According to Buffer Status Reporting as quoted above, a Truncated BSR MAC control element reports buffer status of a logical channel group with the highest priority logical channel with data available for transmission. That is, the truncated BSR MAC control element reports the most important buffer status. However, a logical channel group with the highest priority logical channel with data available for transmission may not be handled by the network node that received the Truncated BSR MAC control element. Accordingly, the network may not be able to receive necessary UE buffer status or transferring UE buffer status may still be required. Thus, there is a need to minimize the risk of scheduling delay and poor uplink performance.

In various embodiments disclosed herein, when a UE decides the content of a Truncated BSR MAC control element, the UE should make the decision based not only on the priority of logical channels with data available for transmission but also taking into account the mapping between logical channels and serving cells. Alternatively, the UE should also make the decision by taking into account the serving cell the Truncated BSR MAC control element will be transmitted in. However, the trade-off is the network may lose the chance to acquire the most important buffer status, i.e., the buffer status of a logical channel group with the highest priority logical channel with data available for transmission.

Generally, in one embodiment, when receiving an uplink resource to transmit a Truncated BSR MAC control element in a specific serving cell, the UE should indicate buffer status corresponding to a specific logical channel group by the Truncated BSR MAC control element. The specific logical channel group includes a logical channel having highest priority among a set of established logical channels mapping to the specific serving cell and with data available for transmission, but the specific logical channel may not have the highest priority among all established logical channels with data available for transmission.

In one embodiment, a logical channel mapping to a serving cell means that data from the logical channel is allowed to be transmitted in the serving cell. The UE may have dual connectivity to macro and small cell layers. C-plane and U-plane of the UE could be handled by different network nodes. The UE may be configured Carrier Aggregation with serving cells controlled by different eNBs. When deciding the content of a Long BSR MAC control element (transmitted in a macro cell or a pico cell), the criteria mentioned above, e.g. mapping or cell to transmit the BSR MAC control element, may not need to be taken into account.

Figure 14:
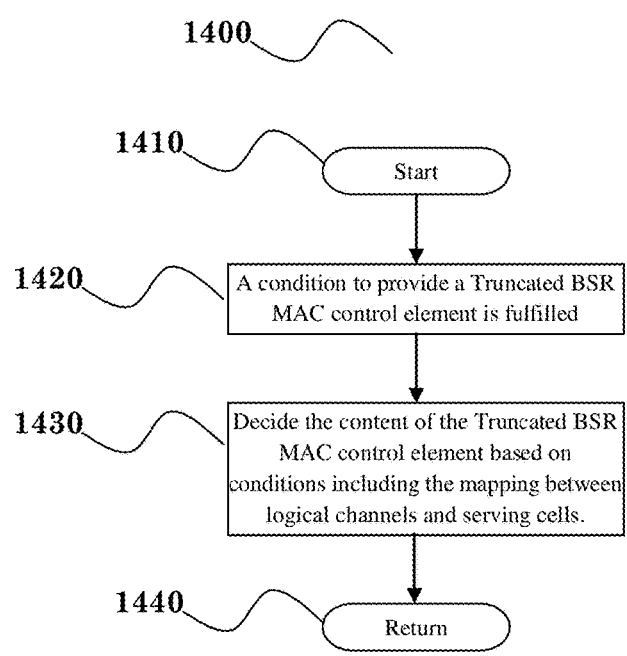
FIG. 14 a flow diagram according to one exemplary embodiment.

FIG. 14 illustrates one method of a UE. At step 1410, the method is started. At step 1420, a condition to provide a Truncated BSR MAC control element is fulfilled. At step 1430, a determination is made regarding the content of the Truncated BSR MAC control element based on conditions, including, but not limited to, the mapping between logical channels and serving cells. At step 1440, return.

In one embodiment, a method of a UE utilizing at least two serving cells is disclosed. In this method, the UE connects to at least two serving cells, including a first serving cell and a second serving cell. At least two logical channels are established, including a first logical channel which belongs to a first logical channel group and a second logical channel which belongs to a second logical channel group. In one embodiment, the first logical channel has higher priority than the second logical channel. The first logical channel is mapped to at least the first serving cell but not to the second serving cell. The second logical channel is mapped to at least the second serving cell. An uplink grant is received for a transmission in the second serving cell. A determination is made and confirmed that a condition to include a BSR MAC control element in the transmission is fulfilled and both the first logical channel and the second logical channel have data available for transmission. The BSR MAC control element indicates buffer status corresponding to the second logical channel group when the second logical channel has highest priority among a set of established logical channels mapping to at least the second serving cell and with data available for transmission.

In one embodiment, the first serving cell is Primary Cell (PCell) or a macro cell. In one embodiment, the second serving cell is a Secondary Cell (SCell) or a pico cell. In one embodiment, the first serving cell and the second serving cell are controlled by different eNBs.

In one embodiment, the first logical channel corresponds to a SRB. Additionally, in one embodiment, the first logical channel has highest priority among all established logical channels. In another embodiment, the first logical channel group does not include a logical channel mapping the second serving cell.

In one embodiment, the second logical channel corresponds to a DRB. Additionally, in one embodiment, the second logical channel is not mapping to the first serving cell. In another embodiment, the second logical channel group does not include a logical channel mapping the first serving cell.

In one embodiment, data from the first logical channel and data from the second logical channel are transmitted by different MAC entities. Alternatively, data from the first logical channel and data from the second logical channel are transmitted by the same MAC entity. In another embodiment, the mapping between logical channels and serving cells are configured by network. In one embodiment, a logical channel mapping to a serving cell means that data from the logical channel is allowed to be transmitted in the serving cell. In another embodiment, data from a logical channel cannot be transmitted to a serving cell that is not mapped to the logical channel.

In one embodiment, the BSR MAC control element includes buffer status corresponding to only one logical channel group. In another embodiment, the BSR MAC control element is a Truncated BSR MAC control element. In another embodiment, the BSR MAC control element is generated due to a Padding BSR.

In one embodiment, the set of established logical channels consists of all established logical channels mapping to at least the second serving cell and with data available for transmission.

In one embodiment, the condition to include the BSR MAC control element in a MAC PDU is the number of padding bits in the MAC PDU that is equal to or larger than the size of a Short BSR MAC control element plus its subheader but smaller than the size of a Long BSR MAC control element plus its subheader if more than one logical channel group has data available for transmission in the TTI where a BSR MAC control element is transmitted.

In one embodiment, when receiving another uplink grant for another transmission in the first serving cell and a condition to include a Long BSR MAC control element in the another transmission is fulfilled and both the first logical channel and the second logical channel have data available for transmission, indicating, in the Long BSR MAC control element, both buffer status corresponding to the first logical channel group and buffer status corresponding to the second logical channel group.

In one embodiment, when receiving another uplink grant for another transmission in the second serving cell and a condition to include a Long BSR MAC control element in the another transmission is fulfilled and both the first logical channel and the second logical channel have data available for transmission, indicating, in the Long BSR MAC control element, both buffer status corresponding to the first logical channel group and buffer status corresponding to the second logical channel group.

In one embodiment, when receiving another uplink grant for another transmission in the second serving cell and a condition to include a Long BSR MAC control element in the another transmission is fulfilled and both the first logical channel and the second logical channel have data available for transmission, indicating, in the Long BSR MAC control element, buffer status corresponding to the second logical channel group but not buffer status corresponding to the first logical channel group.

In one embodiment, when receiving another uplink grant for another transmission in the second serving cell and a condition to include the BSR MAC control element in the another transmission is fulfilled and the first logical channel has data available for transmission and the second logical channel does not have data available for transmission, indicating, in the BSR MAC control element, buffer status corresponding to the first logical channel group when the set of established logical channels is empty and the first logical channel has highest priority among all established logical channels with data available for transmission.

Referring back to FIGS. 3 and 4, the device 300 includes a program code 312 stored in memory 310. In one embodiment, the CPU 308 could execute program code 312 to execute one or more of the following: (i) to connect to more than one serving cell, (ii) to trigger a Buffer Status Report (BSR) or a Power Headroom Report (PHR), and (iii) to transmit a Medium Access Control (MAC) control element corresponding to the BSR or the PHR in a serving cell, wherein the serving cell depends on a trigger of the BSR or the PHR.

In another embodiment, the CPU 308 could execute the program code 312 to execute one or more of the following: (i) to connect to more than one serving cell, (ii) to receive a signaling to configure a mapping corresponding to a data category, and (iii) to transmit or receive a data of the data category in a serving cell, wherein the serving cell is based on the mapping.

In yet another embodiment, the CPU 308 could execute the program code 312 to execute one or more of the following: (i) to connect to at least two serving cells, including a first serving cell and a second serving cell, (ii) to establish at least two logical channels, including a first logical channel and a second logical channel, wherein the first logical channel belongs to a first logical channel group and is mapping to at least the first serving cell but not to the second serving cell, and the second logical channel belongs to a second logical channel group and is mapping to at least the second serving cell, and wherein the first logical channel has higher priority than the second logical channel, (iii) to receive an uplink grant for a transmission in the second serving cell, (iv) to include a Buffer Status Report (BSR) Medium Access Control (MAC) control element in the transmission, wherein both the first logical channel and the second logical channel have data available for transmission, and (v) to indicate, in the BSR MAC control element, a buffer status corresponding to the second logical channel group when the second logical channel has the highest priority among a set of established logical channels mapping to at least the second serving cell and with data available for transmission, wherein the BSR MAC control element includes buffer status corresponding to only one logical channel group.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), the method comprising:
    connecting to multiple serving cells controlled by different evolved Node Bs (eNBs), wherein a mapping between radio bearers and the connected serving cells is configured according to information provided by network and each of the radio bearers corresponds to one or a group of the connected serving cells;
    triggering a Buffer Status Report (BSR) due to higher priority data arrival from a specific radio bearer;
    triggering a Scheduling Request (SR) due to the triggering of the BSR;
    transmitting the SR on a Physical Uplink Control Channel (PUCCH) of a serving cell for SR transmission corresponding to the specific radio bearer, wherein a PUCCH resource for the SR is configured in more than one of the connected serving cells of the UE, and
    transmitting a Medium Access Control (MAC) control element corresponding to the BSR in a serving cell for BSR transmission corresponding to the specific radio bearer,
    wherein the MAC control element includes status of buffered data which can be transmitted in the serving cell for BSR transmission and does not include status of buffered data which cannot be transmitted in the serving cell for BSR transmission, and
    wherein a mapping between MAC entities and the connected serving cells is configured according to the information provided by the network.

2. The method of claim 1, wherein multiple MAC entities are used by the UE and one MAC entity corresponds to one eNB.

3. The method of claim 2, wherein each MAC entity has its own Discontinuous Reception (DRX) operation.

4. A communication device, comprising:
    a control circuit;
    a processor installed in the control circuit;
    a memory installed in the control circuit and operatively coupled to the processor;
    wherein the processor is configured to execute a program code stored in the memory to implement small cell enhancement by:
        connecting to multiple serving cells controlled by different evolved Node Bs (eNBs), wherein a mapping between radio bearers and the connected serving cells is configured according to information provided by network and each of the radio bearers corresponds to one or a group of the connected serving cells;
        triggering a Buffer Status Report (BSR) due to higher priority data arrival from a specific radio bearer;
        triggering a Scheduling Request (SR) due to the triggering of the BSR;
        transmitting the SR on a Physical Uplink Control Channel (PUCCH) of a serving cell for SR transmission corresponding to the specific radio bearer, wherein a PUCCH resource for the SR is configured in more than one of the connected serving cells of the UE, and
        transmitting a Medium Access Control (MAC) control element corresponding to the BSR in a serving cell for BSR transmission corresponding to the specific radio bearer,
        wherein the MAC control element includes status of buffered data which can be transmitted in the serving cell for BSR transmission and does not include status of buffered data which cannot be transmitted in the serving cell for BSR transmission, and
        wherein a mapping between MAC entities and the connected serving cells is configured according to the information provided by the network.

5. The communication device of claim 4, wherein multiple MAC entities are used by the UE and one MAC entity corresponds to one eNB.

6. The communication device of claim 5, wherein each MAC entity has its own Discontinuous Reception (DRX) operation.

7. A method of a User Equipment (UE), the method comprising:
    connecting to multiple serving cells controlled by different evolved Node Bs (eNBs), wherein multiple buffer status retransmission timers are used to trigger a Buffer Status Report (BSR) and a mapping between the multiple buffer status retransmission timers and the connected serving cells is configured according to information provided by network, each of the multiple buffer status retransmission timers corresponds to one or a group of the connected serving cells;
    triggering the BSR due to expiry of a buffer status retransmission timer of the multiple buffer status retransmission timers;
    triggering a Scheduling Request (SR) due to the triggering of the BSR;
    transmitting the SR on a Physical Uplink Control Channel (PUCCH) of a serving cell for SR transmission selected based on the trigger of the BSR, wherein a PUCCH resource for the SR is configured in more than one of the connected serving cells of the UE, and
    transmitting a Medium Access Control (MAC) control element corresponding to the BSR in a serving cell for BSR transmission corresponding to the expired buffer status retransmission timer,
    wherein the MAC control element includes status of buffered data which can be transmitted in the serving cell for BSR transmission and does not include status of buffered data which cannot be transmitted in the serving cell for BSR transmission, and
    wherein a mapping between MAC entities and the connected serving cells is configured according to the information provided by the network.

8. The method of claim 7, wherein multiple MAC entities are used by the UE and one MAC entity corresponds to one eNB.

9. The method of claim 8, wherein each MAC entity has its own Discontinuous Reception (DRX) operation.

10. A communication device, comprising:
    a control circuit;
    a processor installed in the control circuit;
    a memory installed in the control circuit and operatively coupled to the processor;
    wherein the processor is configured to execute a program code stored in the memory to implement small cell enhancement by:
        connecting to multiple serving cells controlled by different evolved Node Bs (eNBs), wherein multiple buffer status retransmission timers are used to trigger a Buffer Status Report (BSR) and a mapping between the multiple buffer status retransmission timers and the connected serving cells is configured according to information provided by network, each of the multiple buffer status retransmission timers corresponds to one or a group of the connected serving cells;

triggering the BSR due to expiry of a buffer status retransmission timer of the multiple buffer status retransmission timers;

triggering a Scheduling Request (SR) due to the triggering of the BSR;

transmitting the SR on a Physical Uplink Control Channel (PUCCH) of a serving cell for SR transmission selected based on the trigger of the BSR, wherein a PUCCH resource for the SR is configured in more than one of the connected serving cells of the UE, and transmitting a Medium Access Control (MAC) control element corresponding to the BSR in a serving cell for BSR transmission corresponding to the expired buffer status retransmission timer, wherein the MAC control element includes status of buffered data which can be transmitted in the serving cell for BSR transmission and does not include status of buffered data which cannot be transmitted in the serving cell for BSR transmission, and wherein a mapping between MAC entities and the connected serving cells is configured according to the information provided by the network.

11. The communication device of claim 10, wherein multiple MAC entities are used by the communication device and one MAC entity corresponds to one eNB.

12. The communication device of claim 11, wherein each MAC entity has its own Discontinuous Reception (DRX) operation.

13. The method of claim 1, wherein the MAC control element is transmitted by a MAC entity corresponding to the specific radio bearer.

14. The communication device of claim 4, wherein the MAC control element is transmitted by a MAC entity corresponding to the specific radio bearer.

15. The method of claim 7, wherein the MAC control element is transmitted by a MAC entity corresponding to the expired buffer status retransmission timer.

16. The communication device of claim 10, wherein the MAC control element is transmitted by a MAC entity corresponding to the expired buffer status retransmission timer.

* * * * *